United States Patent [19]

Lindner et al.

[11] Patent Number: 4,683,267

[45] Date of Patent: Jul. 28, 1987

[54] THERMOPLASTIC MOULDING COMPOUNDS BASED ON POLYOXYMETHYLENE AND POLYMERIC ADIPATECARBONATE MIXED ESTERS

[75] Inventors: Christian Lindner, Cologne; Karola Brudermanns, Leverkusen; Helmut Waniczek, Cologne; Walter Uerdingen; Helmut Hurnik, both of Leverkusen, all of Fed. Rep. of Germany

[73] Assignee: Bayer Aktiengesellschaft, Leverkusen, Fed. Rep. of Germany

[21] Appl. No.: 740,636

[22] Filed: Jun. 3, 1985

[30] Foreign Application Priority Data

Jun. 13, 1984 [DE] Fed. Rep. of Germany ....... 3421864

[51] Int. Cl.$^4$ ............................................. C08L 61/02
[52] U.S. Cl. .................................... 525/133; 525/146; 525/154; 525/400; 525/411; 525/413; 525/92
[58] Field of Search ................. 525/92, 133, 154, 400, 525/413, 411, 146

[56] References Cited

U.S. PATENT DOCUMENTS

| | | | |
|---|---|---|---|
| 3,290,261 | 12/1966 | Goldblum | 521/77 |
| 4,080,356 | 3/1978 | Gergen et al. | 525/92 |
| 4,169,868 | 10/1979 | Schreckenberg et al. | 525/413 |
| 4,277,577 | 7/1981 | Burg et al. | 525/154 |

FOREIGN PATENT DOCUMENTS

| | | |
|---|---|---|
| 1596900 | 9/1981 | Canada . |
| 1238210 | 4/1967 | Fed. Rep. of Germany . |
| 2389657 | 12/1978 | France . |

OTHER PUBLICATIONS

Encyclopedia Britannica, Inc., "Rubber", p. 1179, 1979.

*Primary Examiner*—Wilbert J. Briggs, Sr.
*Attorney, Agent, or Firm*—Connolly & Hutz

[57] ABSTRACT

Moulding compounds consisting of a mixture of (A) from 99.99 to 60 parts, by weight, of a polyoxymethylene; (B) from 0 to 40 parts, by weight, of an elastomer having a softening temperature below the crystallite melting point of polyoxymethylene (A) and a freezing point below 0° C.; and (C) from 0.01 to 40 parts, by weight, of an aliphatic, rubber-like, high molecular weight adipate-carbonate mixed ester.

3 Claims, No Drawings

THERMOPLASTIC MOULDING COMPOUNDS BASED ON POLYOXYMETHYLENE AND POLYMERIC ADIPATECARBONATE MIXED ESTERS

Thermoplastic moulding compounds based on polyoxymethylene, i.e. on oxymethylene homo- and copolymers, have long been known as chemical materials used mainly for technical articles. It is also known that products having improved impact strength compared with that of unmodified polyoxymethylene are obtained by mixing such polyoxymethylene with suitable elastomers, e.g. with polyesters of aliphatic dicarboxylic acids and $\zeta,\omega$- diols according to U.S. Pat. No. 3,795,715 or with copolyesters of aromatic dicarboxylic acids and diols having different molecular weights according to DE-OS No. 2,449,343 or with copolymers of ethylene and vinyl acetate or acrylic esters according to DE-OS No. 1,769,560 or with polyurethanes obtained from polyhydroxyl compounds, polyisocyanates and chain-lengthening agents according to DE-OS No. 1,193,240. All these mixtures, however, are still unsatisfactory in terms of mechanical properties, e.g. they have insufficient notched impact strength, in particular at low temperatures, and an insufficient processing range and thermostability and thermoplastic processing range.

According to the present invention, it was found that mixtures based on polyoxymethylene have improved properties if they contain aliphatic polymeric adipate-carbonate mixed esters.

The present invention therefore relates to thermoplastic moulding compounds based on polyoxymethylene, comprising (A) from 99.99 to 60 parts, by weight, of polyoxymethylene;
(B) from 0 to 40 parts, by weight, of an elastomer having a softening temperature below the crystallite melting point of polyoxymethylene (A) and a freezing temperature of less than 0° C.; and
(C) from 0.01 to 40 parts, by weight, of an aliphatic, rubberlike high molecular weight adipate-carbonate mixed ester.

The proportion of polyoxymethylene, used as component (A), is preferably from 99.50 to 80 parts, by weight; the proportion of elastomer component (B) is preferably from 0 to 20 parts, by weight; and the proportion of mixed ester (C) is preferably from 0.05 to 20 parts, by weight.

Particularly advantageous results are obtained using a mixture of from 98.5 to 90 parts, by weight, of component (A), from 1.0 to 10 parts, by weight, of component (B) and from 0.05 to 5 parts, by weight, of component (C).

The polyoxymethylenes used as component (A) are to be understood to comprise in particular homopolymers of formaldehyde or trioxane or trioxane copolymers, preferably having a linear structure.

Homopolymers of formaldehyde or trioxane are those formaldehyde or trioxane homopolymers in which the hydroxyl end groups have been chemically stabilized agasint degradation in known manner, e.g. by esterification or etherification.

By "trioxane copolymers" are meant copolymers of trioxane and cyclic ethers, cyclic acetals and/or linear polyacetals which have primary alcohol groups.

The comonomers for trioxane may be (a) cyclic ethers having 3, 4 or 5, preferably 3, ring members; (b) cyclic acetals other than trioxane, having from 5 to 11, preferably 5, 6, 7 or 8, ring members; and (c) linear polyacetals, used in each case in quantities of from 0.1 to 20%, by weight, preferably from 0.5 to 10%, by weight. Most suitable are copolymers of from 99 to 95%, by weight, of trioxane and from 1 to 5%, by weight, of one of the above-mentioned co-components.

Suitable comonomers for trioxane are in particular compounds corresponding to the following general formula:

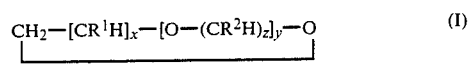

wherein (A) $R^1$ and $R^2$, which may be the same or different, each represents a hydrogen atom, an aliphatic alkyl group having from 1 to 6, preferably 1, 2, 3 or 4, carbon atoms or a phenyl group, and (a) x represents 1, 2 or 3 and y represents zero, or (b) x represents zero, y represents 1 and z represents 3, 4, 5 or 6; or (B) $R^1$ represents an alkoxy methyl group having from 2 to 6, preferably 2, 3 or 4, carbon atoms or a phenoxy methyl group, x represents 1, y represents zero and $R^2$ is as defined above.

The cyclic ethers used are mainly epoxides, e.g. ethylene oxide, styrene oxide, propylene oxide and epichlorohydrin, as well as phenyl glycidyl ethers.

Particularly suitable cyclic acetals are the cyclic formals of aliphatic or cycloaliphatic $\zeta,\omega$-diols having from 2 to 8, preferably 2, 3 or 4, carbon atoms, in which the carbon chain may be interrupted by an oxygen atom at intervals of 2 carbon atoms, e.g. glycol formal (1,3-dioxolane), propane diol formal (1,3-dioxane), butane diol formal (1,3-dioxepane) and diglycol formal (1,3,6-trioxocane), as well as 4-chloromethyl-1,3-diocolane and hexane diol formal (1,3-dioxonane).

Unsaturated formals such, as butene diol formal (1,3-dioxacycloptene-[5 7]) may also be used.

Both homo- and co-polymers of the above cyclic acetals and linear condensates of aliphatic or cycloaliphatic $\zeta,\omega$-diols with aliphatic aldehydes, preferably formal aldehyde, may be used as linear polyacetals. Homopolymers of cyclic formals of aliphatic $\zeta,\omega$-diols having from 2 to 8, preferably 2, 3 or 4, carbon atoms are particularly suitable, e.g. poly(1,3-dioxolane), poly(1,3-dioxane) and poly(1,3-dioxepane).

Compounds containing several polymerisable groups in the molecule may also be used as additional comonomers for trioxane, e.g. alkyl glycidyl formals, polyglycoldiglycidyl ethers, alkane diol diglycidyl ethers and bis-(alkane triol)-triformals; these compounds may be used in a quantity of from 0.05 to 5%, by weight, preferably from 0.1 to 2%, by weight, based on the total quantity of monomers.

Alkyl glycidyl formals are compounds corresponding to the following general formula (II):

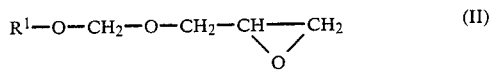

wherein $R^1$ represents an aliphatic alkyl group containing from 1 to 10, preferably 1 to 5, carbon atoms. Particularly suitable alkyl glycidyl formals corresponding to the above general formula are those having linear, saturated aliphatic alkyl groups, e.g. methyl glycidyl formal, ethyl glycidyl formal, propyl glycidyl formal and butyl glycidyl formal.

Polyglycol diglycidyl ethers are compounds corresponding to the following general formula (III):

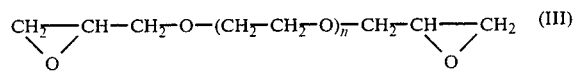

wherein n represents an integer of from 2 to 5. Polyglycol diglycidyl ethers corresponding to the above general formula wherein n represents 2 or 3 are particularly suitable, e.g. diethylene glycol diglycidyl ether and triethylene glycol diglycidyl ether.

Alkane diol diglycidyl ethers are compounds corresponding to the following general formula (IV):

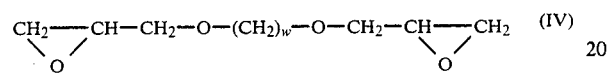

wherein w represents an integer of from 2 to 6, preferably 2, 3 or 4. Butane diol diglycidyl ether is particularly suitable.

Bis(alkane triol)-triformals are compounds having one linear and two cyclic formal groups, in particular compounds corresponding to the following general formula (V):

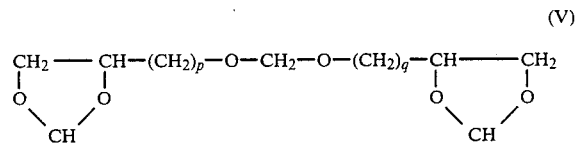

wherein p and q each represent an integer of from 3 to 9, preferably 3 or 4. Symmetric bis-(alkane triol)-triformals corresponding to the above general formula wherein p and q have the same value are particularly suitable, e.g. bis-(1,2,5-pentane triol)-triformal, and particularly bis-(1,2,6-hexane triol)-triformal.

The reduced specific viscosity (RSV value) of the polyoxymethylene generally has values of from 0.3 to 2.0 dl·g$^{-1}$, preferably from 0.5 to 1.5 dl·g$^{-1}$ (determined in butyrolactone, stabilized with 2%, by weight, of diphenylamine, at 140° C. in a concentration of 0.5 g/100 ml).

The crystallite melting points of the polyoxymethylenes are from 140° to 180° C., preferably from 150° to 170° C., and the densities thereof are generally from 1.38 to 1.45 g. ml$^{-1}$, preferably from 1.40 to 1.43 g·ml$^{-1}$, (determined according to DIN 53 479).

The trioxane copolymers used according to the present invention, which are preferably binary or ternary copolymers, are prepared by the known method of polymerising the monomers in the presence of cationically-active catalysts at temperatures of from 0° to 100° C., preferably from 50° to 90° C., (see e.g. U.S. Pat. No. 3,027,352). The catalysts used may be, for example, Lewis acids, e.g. boron trifluoride and antimony pentafluoride, and complex compounds of Lewis acids, preferably etherates, e.g. boron trifluoride diethyl etherate and boron trifluoride di-t-butyl-etherate. Protonic acids, e.g. perchloric acid, and salt-type compounds, e.g. triphenyl methyl hexafluorophosphate, triethyloxonium tetrafluoroborate and acetyl perchlorate, are also suitable. Polymerisation may be carried out solvent-free or in suspension or solution. The copolymers are preferably subjected to a controlled partial degradation by heat or hydrolysis down to the primary alcoholic end groups in order to remove unstable constituents, (see U.S. Pat. Nos. 3,103,499 and 3,219,623).

The homopolymers of formaldehyde or of trioxane used according to the present invention are also prepared in known manner by catalytic polymerisation of the monomer (see e.g. U.S. Pat. Nos. 2,768,994 and 2,989,505).

The elastomers used as component (B) are preferably homo- and co-polymers of olefinically unsaturated compounds corresponding to the following general formula (VI):

wherein $R_1$ represents a hydrogen atom or a methyl or ethyl group, and $R_2$ represents a hydrogen atom, a carboxyl group or the corresponding salts of a metal of Groups I to III of the Periodic Tystem, in particular alkali metal, alkaline earth metal or zinc salts, an alkyl carboxy group having from 2 to 10, preferably from 2 to 5, carbon atoms, an acyloxy group having from 2 to 5, preferably 2 or 3, carbon atoms, a cyano group, a phenyl group or a vinyl group; the softening temperature of these elastomers lying below the crystallite melting point of the particular polyoxymethylene, preferably from 50° to 160° C., while the freezing point is from $-120°$ to 30° C., preferably from $-80°$ to 0° C.

The following are mentioned as examples: (1) Homo- and co-polymers of ζ-olefins, e.g. polyethylene, ethylene/propylene copolymers, ethylene/acrylic acid ester copolymers, ethylene/methacrylic acid ester copolymers and ethylene/acrylic acid copolymers. The following are particularly suitable: polyethylene, copolymers of ethylene with vinyl acetate and copolymers of ethylene with acrylic acid esters, particularly with methyl, ethyl, butyl or 2-ethylhexyl acrylic acid esters, wherein the proportion, by weight, of ethylene is from 4 to 90%, preferably from 50 to 80%.

(2) Homo- and co-polymers of 1,3-dienes containing 4 or 5 carbon atoms, e.g. polybutadiene, polyisoprene, butadiene/styrene copolymers and butadiene/acrylonitrile copolymers.

(3) Homo- and co-polymers of vinyl esters, e.g. polyvinyl acetate, polyvinyl propionate and polyvinyl butyrate.

(4) Homo- and co-polymers of acrylic and methacrylic acid esters, e.g. polyethyl acrylate, polybutyl acrylate, polybutyl methacrylate, polyhexyl methacrylate, poly-2-ethyl-hexylmethacrylate and polyoctyl methacrylate.

The molecular weights (weight average) of the elastomers used according to the present invention may vary within wide limits. Products having molecular weights of from 1,000 to 1,000,000, preferably from 1,000 to 300,000, are suitable; particularly advantageous results have been obtained with mixed components having molecular weights of from 5,000 to 150,000. The melt indices (at 190° C. and under a load of 2.16 kp) are generally from 1 to 1,000 g /10 Min., preferably from 1 to 500 g/10 Min.

Adipate-carbonate mixed esters are compounds corresponding to the following general formula (VII):

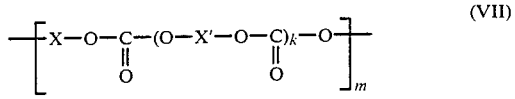

(VII)

wherein
X and X' represent residues of the reaction product of a polyhydric alcohol and adipic acid having a molecular weight of from 800 to 3,500;
k represents an integer of from 0 to 10; and
m represents an integer greater than 20, preferably from 22 to 100;
which compounds have a limiting viscosity number [η] (Staudinger Index) in tetrahydrofuran of from 0.8 to 2.5 dl/g.

The following are examples of polyhydric alcohols which may be used, optionally as mixtures, for the polyesters from which the residues X and X' are derived: ethylene glycol, propylene glycol-(1,2) and -(1,3), butylene glycol-(1,4) and -(2,3), hexane diol-(1,6), octane diol-(1,8), neopentyl glycol, cyclohexane dimethanol, 1,4-bis-(hydroxymethyl cyclohexane), 2-methyl-1,3-propane diol, diethylene glycol, triethylene glycol, tetraethylene glycol, dipropylene glycol and dibutylene glycol.

The reaction products obtained from adipic acid and the alcohols are polyesters having hydroxyl end groups. The molecular weights thereof range from about 800 to about 3,500. The adipate-carbonate mixed esters are prepared from these polyesters by a reaction with difunctional carbonic acid aryl esters. These correspond in particular to the following general formula (VIII):

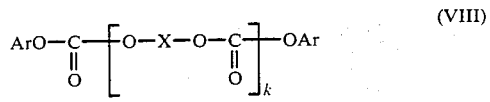

(VIII)

wherein
AR represents a substituted or unsubstituted aryl group having from 6 to 18 carbon atoms, preferably 6 carbon atoms; and
k and X' are as defined above.
Compounds of this type are known.

The catalysts used for the reaction of the hydroxyl group-containing polyesters with the carbonic acid aryl esters may be transesterification catalysts, such as alkali metal or alkaline earth metal phenolates, alkali metal or alkaline earth metal alcoholates, tertiary amines, such as triethylene diamine, morpholine, pyridine, or triethylamine, or metal compounds, such as antimony trioxide, zinc chloride, titanium tetrachloride and butyl titanate.

The catalysts are used in quanitites of from 10 to 300 ppm, based on the total weight of the polycondensation components. Smaller quantities of catalyst may be sufficient if the starting materials contain no basic impurities when acid catalysts are used and no acid impurities when basic catalysts are used. The quanitites of catalyst used are preferably as small as possible in order to avoid colouring the products.

The reaction is preferably carried out solvent-free, although solvents which are inert under the reaction conditions, such as hydrocarbons, in particular aromatic hydrocarbons, may be used.

The reaction time depends on the reaction temperature, the nature and quantity of catalyst used and the desired molecular weight of the carbonate group-containing polyester. From 2 to 48 hours are generally sufficient, from 4 to 24 hours being preferred.

The volatile condensation products formed may be removed during the reaction, either by distillation if the process is carried out batch-wise or by fractional distillation if the process is carried out continuously. A mixture of polyester diol and bifunctional carbonic acid aryl ester, preferably diphenyl carbonate, or a mixture of diphenyl carbonate and compounds (VIII) is preferably polycondensed at from 110° to 170° C. with the aid of sodium phenolate as catalyst and the viscosity of the polycondensation mixture is then raised at 170° C. or higher by the addition of bifunctional carbonic acid aryl ester (VIII), preferably wherein k represents 1, with concomitant removal of volatile condensation products by distillation. It has been found advantageous to carry out the polycondensation in high viscosity reactors, such as kneaders or screw machines.

Polycondensation may be terminated in known manner, e.g. by lowering the reaction temperature or destroying or removing the catalyst or by means of so-called "stoppers". It has been found advantageous to use carboxylic acid aryl esters as stoppers for alcoholic end groups and alcohols as stoppers for aryl carbonate end groups. When bifunctional compounds are used as stoppers, polycondensation may be stopped at an increased average molecular weight if the stopper is accurately dosed.

Adipate-carbonate mixed ester polymers (C) suitable for the purposes of the present invention are known and have been described inter alia in DOS No. 2,823,161 and DOS No. 2,732,718.

The limiting viscosity number (Staudinger Index) [η] of component (C) was determined in tetrahydrofuran at 25° C. and given in terms of dl/g. For a definition, see H. G. Elias "Makromoleküle", Huthing & Wepf-Verlag, Basel, page 265.

The moulding compound according to the present invention is advantageously prepared by mixing the components, which are preferably in the form of powders or granulates, and then homogenising. Mixing is normally carried out at room temperature, preferably at from 15° to 30° C., and the mixture may be homogenised by means of suitable mixing apparatus which may be heated, e.g. rollers, calenders, kneaders or extruders, at a temperature above the crystallite melting point of the polyoxymethylene, i.e. at a temperature of from 150° to 250° C., preferably from 170° to 220° C. A temperature of from 175° to 200° C. is particularly suitable. All components of the moulding compounds according to the present invention must be workable in the aforesaid temperature range. Homogenisation may in some cases be accompanied by partial cross-linking of the elastomer component, but this generally has no deleterious effect on the properties of the mixture.

The moulding compound according to the present invention may optionally contain known additives, in particular stabilizers and/or fillers, nucleating agents, anti-static agents, flame retarding agents, lubricants, plasticizers, pigments, dyes, optical brightening agents and mould release agents.

Suitable stabilizers against the effect of heat include, in particular, polyamides, amides of polybasic carboxylic acids and amidines, e.g. dicyandiamide, hydrazines, ureas, poly-(N-vinyl lactams) and alkaline earth metal salts of aliphatic, preferably hydroxyl group-containing, mono- to tri-basic carboxylic acids having from 2 to 20 carbon atoms, e.g. calcium stearate, calcium ricinoleate, calcium lactate and calcium citrate. Oxidation stabilizers used are in the main bisphenol compounds, particularly diesters of monobasic 4-hydroxyphenol-alkanoic acids having from 7 to 13, preferably 7, 8 or 9 carbon atoms, with diols containing from 2 to 6 carbon atoms. ζ-hydroxy benzophenone derivatives and benzotriazole derivatives are suitable light stabilizers. The stabilizers are used in a total quantity of from 0.1 to 5%, by weight, preferably from 0.5 to 3%, by weight (based on the total moulding compound).

Suitable fillers include, for example, asbestos fibres, glass fibers, glass powder, graphite, carbon black, metal powders, metal oxides, silicates, carbonates and molybdenum(IV) sulphide. The quantity of filler used is from 10 to 70%, by weight, preferably from 20 to 40%, by weight, (based on the total quantity of moulding compound).

The moulding compound according to the present invention is distinguished in particular by its exceptionally advantageous balanced profile and spectrum of mechanical use properties and thermoplastic processing characteristics.

Component (C) acts in relatively small quantities as agent for increasing the notched impact strength of the moulding compounds according to the present invention, in particular also in the absence of component (B). When used in larger quantities, component (C) has a plasticizing action and constitutes a particularly advantageous plasticizer, in particular with regard to the stability to migration and the low temperature properties. Whatever the quantity used, the processibility of the moulding compounds is substantially improved. Compared with known polyurethane components, the moulding compounds are unexpectedly distinguished by the particular advantages of higher thermostability and improved mechanical properties so that the compounds, inter alia, have a better colour in the undyed state and are less subject to degradation so that they may be processed thermoplastically at higher temperatures, if necessary under more powerful shearing forces.

The moulding compound according to the present invention may be broken down mechanically, e.g. it may be chopped or ground to granulates, shavings, flakes or powder. It is thermoplastic and may be processed by injection moulding, extrusion, melt spinning or deep drawing. It is a suitable technical material for the production of semifinished and finished goods, such as moulded bodies, including bands, rods, plates, films, tubes and pipes, as well as machine parts, such as housings, gear wheels, bearing parts and control elements.

The examples given below illustrate the present invention. The units used in these Examples were determined as follows:

RSV value determined in butyrolactone, stabilised with 2%, by weight, diphenylamine, at 140° C. in a concentration of 0.5 g/100 ml.

Melt Index: Determined at 190° C. under a load of 2.16 kp according to ASTM-D-1238.

Durometer hardness: According to ASTM-D-2240.

Softening Point: Determined by the method of ASTM-E-28.

Density: According to DIN 53 479.

Processing

Various proportions, by weight, of component (A) (polyoxymethylene), (B) (elastomer) and (C) are mixed at room temperature in the form of powders or granulates, optionally with the addition of suitable stabilizers, melted in a double-screw extruder at 200° C., homogenized and extruded as a strand. The dwell time in the extruder is about 4 minutes. The strand is cut into short pieces and the dried granulate obtained is worked-up in an injection moulding machine to form plates measuring 60×60×2 mm.

DESCRIPTION OF THE MOULDING COMPOUND COMPONENTS (1) Component A1

Copolymer of 98%, by weight, of trioxane and 2%, by weight, of ethylene oxide having primary alcoholic end groups and having a RSV value of 0.8 dl.g$^{-1}$, a density of 1.41 g cm$^{-3}$ and a crystallite melting point of 166° C. 0.1% of calcium ricinoleate and 0.5% of 1,6-bis-[β-(3,5-di-t-butyl-4-hydroxyphenyl)-proprionyloxy]-hexane were used as stabilizer.

Component A2

Polyformaldehyde in which the semi-acetal end groups are blocked by reaction with acetic acid anhydride and which has a RSV value of 0.8 dl.g$^{-1}$, a density of 1.43 g.cm$^{-3}$ and a crystallite melting point of 181° C. The stabilizer used consisted of 1% of a mixed polyamide of caprolactam, hexamethylene diamine, adipic acid and sebacic acid and 0.3% of bis-[β-(3,5-di-t-butyl-4-hydrophenyl)-proprionyloxyl]-hexane.

(2) Component B1

Copolymer of ethylene and vinyl acetate having a vinyl acetate content of from 32 to 34%, by weight, and a melt index of from 22 to 28 g/10 min. The density is 0.957 g.cm$^{-3}$ and the Durometer hardness is 67A. Softening point=116° C.

(3) Component C1 2000 parts, by weight of a polyester diol of adipic acid and a mixture of n-hexane-1,6-diol and neopentyl glycol in proportions of 65:35 (average molecular weight $\overline{M}_n$ 2000, determined by measurement of OH number), 214 parts, by weight, of diphenyl carbonate and 0.12 parts, by weight, of sodium phenolate are stirred under a vacuum of 1.5 Torr at 130° C. for 2 hours and at 150° C. for 1 hour. Volatile polycondensation products, mostly phenol, are distilled off. Under the given distillation conditions, the temperature is raised to 180° C. for 6 hours and to 195° C. for 2 hours. The product obtained, which is a colourless, rubberlike, soft mass, has a Staudinger index [η] of 0.81 determined in THF.

Component C2

2000 parts, by weight, of a polyester diol of adipic acid and a mixture of n-hexane-1,6-diol and neopentyl glycol in proportions of 65:35 having an average molecular weight $\overline{M}_n$ of 2000 (determined by measurement of the OH number), 214 parts, by weight, of diphenyl carbonate and 0.12 parts, by weight, of sodium phenolate are stirred under a vacuum of 1.5 Torr at 130° C. for 2 hours and at 150° C. for 1 hour, volatile polycondensation products, for the most part phenol, being distilled off. As distillation is continued, the temperature is raised to 180° C. for 4 hours. During this time, 20 parts, by weight, of a polytetrahydrofuran diol which is lengthened via —OCCC— bridges and contains phenol carbonate end groups ($M_n$ of polytetrahydrofuran 2000, degree of chain-lengthening=2) are added, and the reaction temperature is then raised to from about 185° to 190° C. for 5 hours with slow stirring or kneading. The product, which is a colourless, rubber-like mass, has a Staudinger index [η], determined in THF, of 1.5.

Component D

Polyester urethane based on a polyester diol of adipic acid and a mixture of n-hexane diol-1,6 and neopentyl glycol (in proportions of 63:35) having an average molecular weight of $\overline{M}_n=2000$ (determined by measurement of OH number); Shore hardness A:72 and D:18; density:1.14 g/cm$^3$.

Assessment of thermostability

The moulding compounds are moulded to form plates by the extruder treatment described. The raw colour of the plates is assessed visually.

+ = good raw colour
+ + = very good raw colour, better than +
− = discolouration.

Comparison of properties of moulding compounds

| No. | Component in %, by weight, height of drop (2)(cm) | | | Thermo-stability | Notched impact strength kJ/m$^{2(1)}$ |
|---|---|---|---|---|---|
| 1 | 100A1 | — | — | 19 | + |
| 2 | 100A1 | — | — | 14 | + |
| 3 | 95A1 | 5B1 | — | 200 | + |
| 4 | 95A1 | — | 5C1 | 240 | ++ |
| 5 | 95A1 | — | 5C2 | 280 | ++ | 20 |
| 6 | 95A2 | — | 5C1 | 230 | ++ |
| 7 | 95A1 | — | 5D | 160 | − | 12 |
| 8 | 95A2 | — | 5D | 95 | − |
| 9 | 95A1 | 4.5B1 | 0.5D | 260 | + |
| 10 | 95A1 | 2.5B1 | 2.5C1 | 300 | ++ |
| 11 | 95A1 | 4.5B1 | 0.5C1 | 300 | ++ |
| 12 | 95A1 | 4.9B1 | 0.1C1 | 290 | ++ |
| 13 | 95A1 | 2.5B1 | 2.5C2 | 300 | ++ |
| 14 | 95A1 | 4.5B1 | 0.5C2 | 300 | ++ |
| 15 | 95A1 | 4.9B1 | 0.1C2 | 300 | ++ |

(1)According to DIN 53 753
(2)Impact strength: Determined by a falling test. The plate to be tested is clamped to a frame and exposed to impact stress by dropping a hammer weighing 500 g perpendicularly from various heights on the plate under low friction conditions, the part of the hammer meeting the plate being in the form of a hemisphere with a diameter of 2 cm. The impact strength is measured by the height of drop at which 50% of the plates are destroyed (average value from 25 tests). The maximum height of drop is 300 cm.

We claim:
1. A moulding composition which comprises:
(A) from 99.99 to 60 parts, by weight, of a polyoxymethylene;
(B) from 0 to 40 parts, by weight, of an elastomer having a softening temperature below the crystallite melting point of (A) and a freezing temperature below 0° C.; and
(C) from 0.01 to 40 parts, by weight, of an aliphatic, high molecular weight adipate-carbonate mixed ester corresponding to:

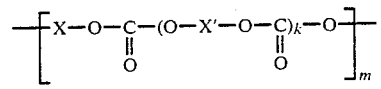

wherein
X and X' represent residues of the reaction product of a polyhydric alcohol and adipic acid having a molecular weight of from 800 to 3,500;
k represents an integer of from 0 to 10; and
m represents and integer greater than 20.
2. A composition as claimed in claim 1 comprising: from 99.5 to 80 parts, by weight, of (A); from 0 to 20 parts, by weight, of (B); and from 0.5 to 20 parts, by weight, of (C).
3. A composition as claimed in claim 2 comprising: from 98.5 to 90 parts, by weight, of (A); from 1 to 10 parts, by weight, of (B); and from 0.5 to 5 parts, by weight, of (C).

* * * * *